United States Patent
Shang et al.

(10) Patent No.: US 12,307,716 B2
(45) Date of Patent: May 20, 2025

(54) METHODS AND SYSTEMS FOR CALIBRATING A CAMERA ARRAY BASED ON DIFFERENTIABLE POINT TARGETS IN A CAPTURE SCENE

(71) Applicant: Verizon Patent and Licensing Inc., Basking Ridge, NJ (US)

(72) Inventors: Tom Hsi Hao Shang, Forest Hills, NY (US); Elena Dotsenko, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 381 days.

(21) Appl. No.: 17/991,347

(22) Filed: Nov. 21, 2022

(65) Prior Publication Data

US 2024/0169585 A1    May 23, 2024

(51) Int. Cl.
G06V 10/00     (2022.01)
G06T 7/80      (2017.01)
H04N 23/90     (2023.01)

(52) U.S. Cl.
CPC ............... *G06T 7/80* (2017.01); *H04N 23/90* (2023.01)

(58) Field of Classification Search
CPC ........... G06T 7/80; G06T 7/85; H04N 17/002; H04N 23/90
See application file for complete search history.

(56) References Cited

U.S. PATENT DOCUMENTS

| | | | |
|---|---|---|---|
| 6,985,175 B2* | 1/2006 | Iwai | G01C 11/06 348/E13.016 |
| 7,957,581 B2* | 6/2011 | Wu | G06T 7/593 382/294 |
| 8,619,183 B2* | 12/2013 | Ito | G02B 7/365 348/355 |
| 8,897,482 B2* | 11/2014 | Mein | G06T 7/593 382/106 |
| 9,189,858 B2* | 11/2015 | Svanholm | G01C 1/04 |
| 9,858,472 B2* | 1/2018 | Ming | G06V 40/172 |
| 9,866,818 B2* | 1/2018 | Myokan | H04N 13/243 |
| 10,664,998 B2* | 5/2020 | Wakai | G06T 7/85 |
| 10,944,955 B2* | 3/2021 | Koyama | G06V 20/46 |
| 11,113,843 B2* | 9/2021 | Dworakowski | G06T 7/80 |
| 2014/0172377 A1* | 6/2014 | Taubin | G06T 17/00 703/1 |
| 2024/0169585 A1* | 5/2024 | Shang | G06T 7/80 |

\* cited by examiner

*Primary Examiner* — Amir Alavi

(57) ABSTRACT

An illustrative camera calibration system may identify a first configuration of a set of differentiable point targets as depicted in a first image of a scene and a second configuration of the set of differentiable point targets as depicted in a second image of the scene. The differentiable point targets may each be independently positionable within the scene and the first and second images may be respectively captured by first and second image capture devices in accordance with first and second poses with respect to the scene, Based on the identified first and second configurations of the differentiable point targets, the camera calibration system may generate calibration parameters for a camera array that includes the first and second image capture devices. The calibration parameters may be configured to represent the first and second poses of the first and second image capture devices, Corresponding methods and systems are also disclosed.

20 Claims, 10 Drawing Sheets

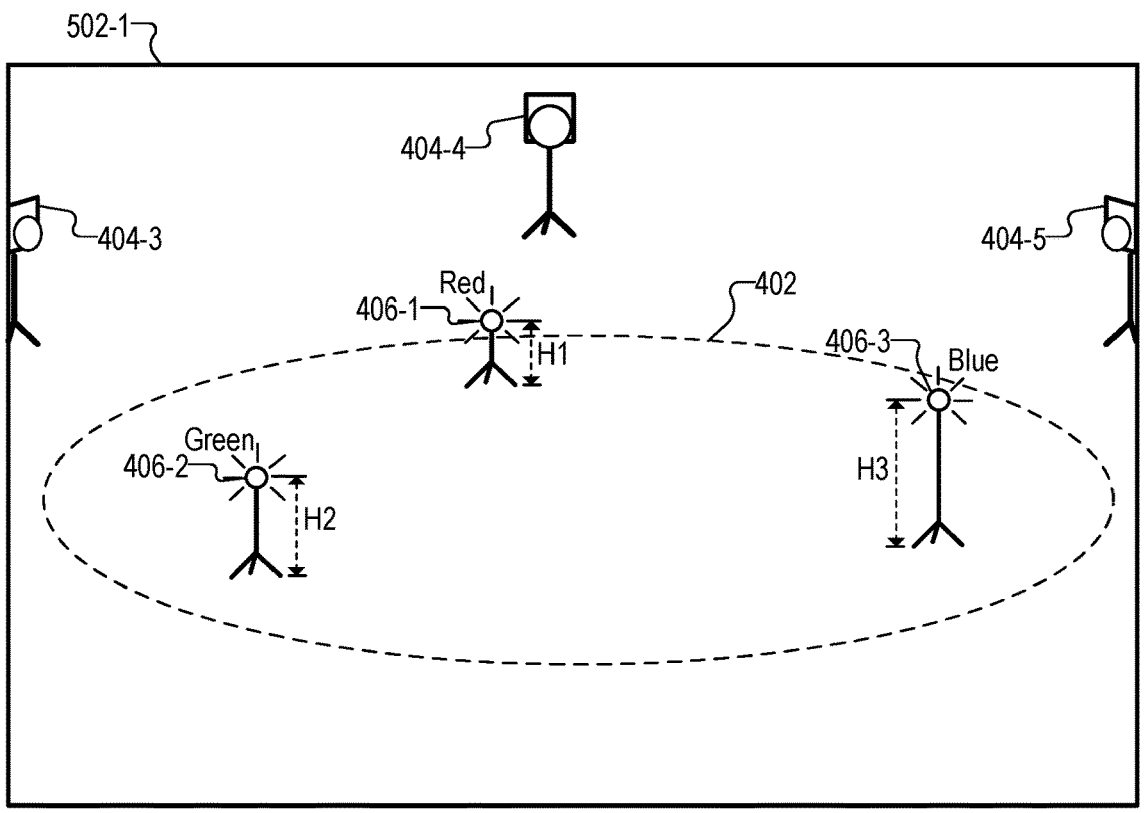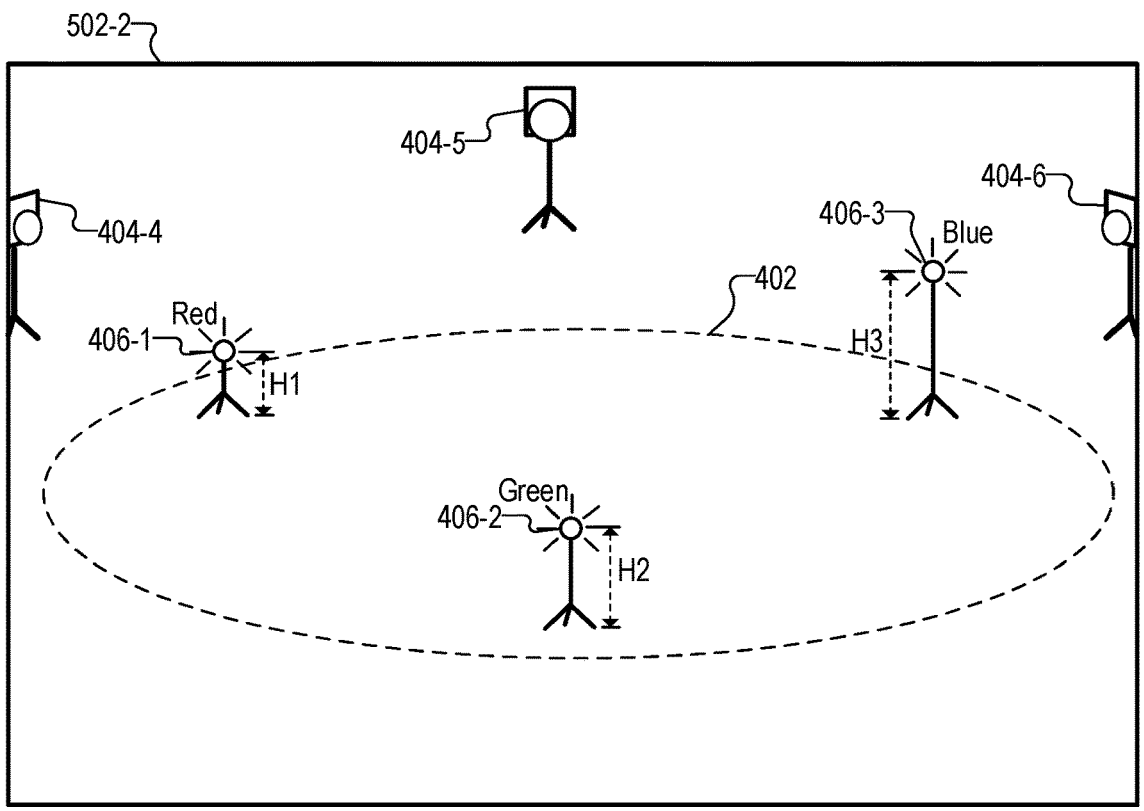
Fig. 5

METHODS AND SYSTEMS FOR CALIBRATING A CAMERA ARRAY BASED ON DIFFERENTIABLE POINT TARGETS IN A CAPTURE SCENE

BACKGROUND INFORMATION

Groups of image capture devices referred to herein as camera arrays may be configured to capture color and/or depth information for a scene. For instance, a camera array may be used to capture still and/or video images depicting the scene, which may be presented to viewers and/or analyzed and processed for various applications. As one example of such an application, three-dimensional (3D) models of objects may be generated based on data generated by image capture devices having multiple different vantage points around the objects. As another example, computer vision may be performed to extract information about objects captured in the images and to implement autonomous processes based on this information. These and various other applications of image processing may be used in a variety of entertainment, educational, industrial, agricultural, medical, commercial, robotics, promotional, and/or other contexts and use cases. For instance, extended reality (e.g., virtual reality, augmented reality, etc.) use cases may make use of volumetric models generated based on intensity (e.g., color) and depth images depicting a scene from various vantage points (e.g., various perspectives, various locations, etc.) with respect to the scene.

Proper calibration of camera arrays (e.g., with respect to a scene that is to be captured, modeled, and/or analyzed by data produced by the camera arrays) may facilitate optimal functionality for these and other image processing applications whether the camera arrays are configured to capture intensity data, depth data, or a combination of these or other types of data representing object surfaces. For example, accurate camera array calibration may enable image processing and/or eliminate various types of performance and quality issues that might otherwise arise in image processing applications that employ camera arrays that are not well-calibrated.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 5 shows illustrative images of the scene of FIG. 4 captured by different image capture devices in accordance with different poses of the image capture devices with respect to the scene.

DETAILED DESCRIPTION OF EXAMPLE EMBODIMENTS

Figure 1:
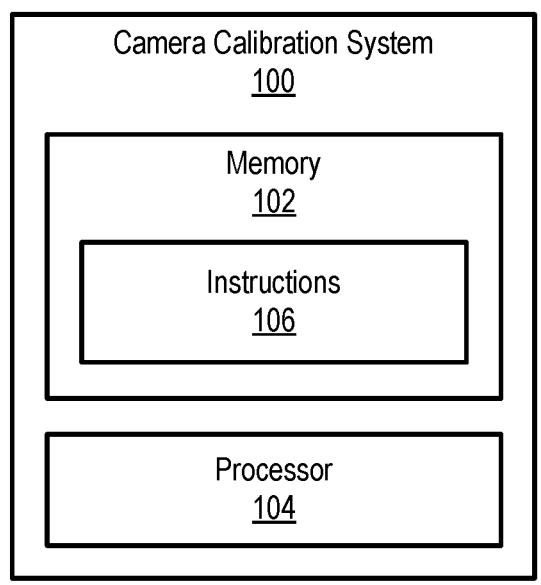
FIG. 1 shows an illustrative camera calibration system for calibrating a camera array based on differentiable point targets in a capture scene.

Methods and systems for calibrating a camera array based on differentiable point targets in a capture scene are described herein. Traditionally, camera array calibration is performed using a physical object referred to as a calibration target that is presented to multiple image capture devices in the camera array at the same time. For example, typical calibration targets used in conventional calibration process include a planar surface (e.g., a flat piece of cardboard, Styrofoam, plastic, etc.) that features a pattern that is easily assessable using automated systems. Such patterns may include chessboard patterns, ArUco patterns, ChArUco patterns, and so forth, all of which include various distinct features (e.g., points where white and black squares meet, etc.) that are readily identifiable in images that capture the calibration targets. Based on images depicting such calibration targets from different vantage points provided by image capture devices having different poses with respect to the scene (and with respect to the calibration target when it is placed at a particular location in the scene), calibration systems may correlate where certain features are detected from the perspectives of the different poses, and may mathematically characterize the different poses of the image capture devices using respective sets of calibration parameters for each pose.

While this conventional approach to calibration has proven effective in many circumstances, there are certain limitations inherent in any approach that relies on a calibration target having physical limitations and imperfections that are impossible to eliminate (as a consequence of the physical nature of the objects) and are difficult to account for. Such limitations become especially important and evident when calibrating camera arrays configured for use with certain types of applications such as applications involving large capture scenes, applications requiring especially high calibration precision and accuracy, and so forth. A few limitations of the traditional approach will now be described to introduce how methods and systems described herein for calibrating camera arrays based on differentiable point targets may address the conventional limitations and provide value to calibration applications that employ these novel methods and systems.

A first limitation of conventional calibration targets such as boards featuring chessboard patterns is that the calibration targets are assumed by calibration systems to be perfect even though, as real-world physical objects, they are of course imperfect. Aspects of the calibration targets that are incorrectly assumed to be ideal may include that the objects are perfectly planar (printed on materials that are perfectly flat and do not bend at all when moved around a scene and presented to the camera array), that the patterns printed on the targets are visible with perfect clarity and sharpness (e.g., without glare, shadows, etc.), and so forth. Since real-world limitations on the manufacture, placement, lighting, and other handling of calibration targets always produce at least some amount of error (e.g., objects that flex slightly to be not perfectly planar and to be inconsistently planar from moment to moment or position to position, patterns and features that are not printed with perfect clarity or having differing amounts of glare when viewed from different angles, etc.), a first source of potential calibration error is introduced by calibration targets that are unable to meet these idealized characteristics (e.g., perfect flatness, perfect clarity, etc.) assumed by calibration systems.

A second limitation of conventional calibration approaches involves confusion in correlating particular features as the features are captured by different image capture devices in a camera array. For example, if one feature (e.g., one intersection of black and white squares on a chessboard pattern) captured by one image capture device is correlated to a different feature (e.g., a different intersection of squares on the chessboard pattern) and the calibration computations assume that this feature is the same (a feature mismatch), significant error may be introduced. Such mismatching becomes increasingly likely as calibration targets grow in size and have increasing numbers of features (e.g., more chessboard squares, etc.).

A third limitation of conventional calibration approaches relates to the fact that there is no possible placement of a planar object within a scene (no matter how perfectly constructed and well-lit that planar object may be) that will allow the same features of the planar object (e.g., chessboard square intersection features, etc.) to be visible from vantage points all around the scene at the same time. If six image capture devices are placed in a circle and pointed inward toward the scene, for example, no more than three or four of these image capture devices would be able to see a surface of a calibration target at the same time regardless of where the target is placed at the scene, since the other image capture devices will be looking at the back of the calibration target (and seeing a different surface). As a result, conventional calibration approaches require that calibration targets be moved to several locations so that they may be analyzed by all the different image capture devices from their respective poses at different positions and unified calibration parameters may be generated only by daisy-chaining information gathered with respect to different positions of the calibration targets. Such daisy-chaining requirements, as well as other differences that may occur from one point in time to another as the calibration target is repositioned and recaptured (e.g., lighting changes, etc.), may introduce another source of error for conventional calibration approaches.

A fourth limitation of conventional calibration approaches stems from the apparent sizes of calibration targets as depicted in images captured by image capture devices with different poses with respect to the scene. For example, a relatively small calibration target may be ideal in terms of minimizing flexing and maximizing the planar characteristics assumed by the calibration calculations (as described above), but this ideal is in tension with the fact that a relatively large calibration target that fills a larger percentage of each image capture device's field of view is ideal in other respects. For instance, low pixel density of patterns represented in a field of view of an image may lead to a high degree of relative error recognizing and defining the pattern since, for example, an error of one pixel is more substantial for a pattern that is only 300 pixels wide versus for a pattern that is 1000 pixels wide. Accordingly, error may be exacerbated by this tension as using larger targets and patterns (e.g., particularly for large scenes) may be desirable or necessary for addressing resolution-related issues even while using smaller targets and patterns may be desirable for addressing physical limitations imposed by the objects themselves.

Methods and system described herein for calibrating a camera array use differentiable point targets instead of conventional calibration targets to simultaneously address many or all of the limitations described above and thereby provide various benefits and advantages for applications leveraging these methods and systems.

As will be further described and illustrated below, a differentiable point target may be implemented as a small, "point"-like object that can be placed at a scene for calibration purposes and that has certain characteristics. First, a differentiable point target may be positionable within the scene so as to be visible from many or all of the poses of image capture devices arranged around the scene, yet may be independently positionable in the sense that the position of the differentiable point target is not dependent of the position of other differentiable point targets (i.e., the differentiable point targets in a set are not physically connected to one another, etc.). Second, a differentiable point target may be readily identifiable and "differentiable" from other point targets in the set, such as by being a unique color or having another unique characteristic that distinguishes it from other differentiable point targets in the set. Third, an object implementing a differentiable point target may be a "point" target in the sense that the object is very small and, ideally, is detected to be located at a particular point in space at the scene (e.g., represented by only one pixel or a small group of pixels in an image). One example of a differentiable point target with all of these characteristics is a small light (e.g., an LED mounted on a rigid stand) that may be independently placed anywhere at a scene and may be distinguished from other such lights by color, brightness, blinking patterns, or other such attributes.

Any three non-linear differentiable point targets placed at a scene may form a virtual plane (defined by the three point targets) that has the ideal characteristics of being perfectly planar (unlike a physical plane such as a Styrofoam board, a virtual plane defined by three point targets cannot flex or exhibit other such imperfections), being impervious to issues like glare (since the plane is virtual, there is no surface on which glare may be produced), and so forth. If these three differentiable point targets are different colors (e.g., red, green, and blue, or other orthogonal colors that are readily distinguishable in a given color scheme), they serve as ideal features that cannot be confused or mismatched when captured by different image capture devices in a camera array configured to differentiate these colors (e.g., an RGB color camera array). If positioned strategically, these three differentiable point targets may be visible to many or all of the image capture devices of a camera array at once (thereby reducing or eliminating the need to daisy-chain information and/or to move the point targets during the capture process) and may create large virtual planes taking up significant portions of the field of view of each image capture device (thereby reducing or eliminating issues with pixel density).

Accordingly, by replacing a conventional calibration target with a set of three or more differentiable point targets, each of the limitations described above may be mitigated and calibration of a camera array with respect to a scene may be made highly accurate, precise, convenient, and efficient (e.g., in terms of set up time, in terms processing since the complexity of the calibration objects is reduced rather increased, etc.). Benefits and advantages arising from this novel approach to calibration may include less error (or no error) introduced by the physicality of the calibration targets, less error (or no error) introduced by daisy-chaining calibrations of groups of cameras in the array, less error (or no error) introduced as a result of resolution errors associated with low pixel density of calibration target representations in captured images, and so forth.

Various specific implementations will now be described in detail with reference to the figures. It will be understood that the specific implementations described below are provided as non-limiting examples and may be applied in various situations. Additionally, it will be understood that other examples not explicitly described herein may also fall within the scope of the claims set forth below. Methods and systems for calibrating a camera array based on differentiable point targets in a capture scene may provide any or all of the benefits mentioned above, as well as various additional and/or alternative benefits that will be described and/or made apparent below.

FIG. 1 shows an illustrative camera calibration system 100 for calibrating a camera array based on differentiable point targets in a capture scene, System 100 may be implemented by computer resources such as processors, memory facilities, storage facilities, communication interfaces, and so forth. For example, system 100 may be implemented by multi-access edge compute (MEG) server systems operating on a provider network (e.g., a cellular data network or other carrier network, etc.), cloud compute server systems running containerized applications or other distributed software, on-premise server systems, user equipment devices, or other suitable computing systems as may serve a particular implementation.

System 100 may include memory resources configured to store instructions, as well as one or more processors communicatively coupled to the memory resources and configured to execute the instructions to perform functions described herein. For example, a generalized representation of system 100 is shown in FIG. 1 to include a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 (e.g., networking and communication interfaces, etc.) may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with calibrating a camera array based on differentiable point targets in a capture scene in accordance with methods and systems described herein and/or as may serve a particular implementation.

Figure 2:
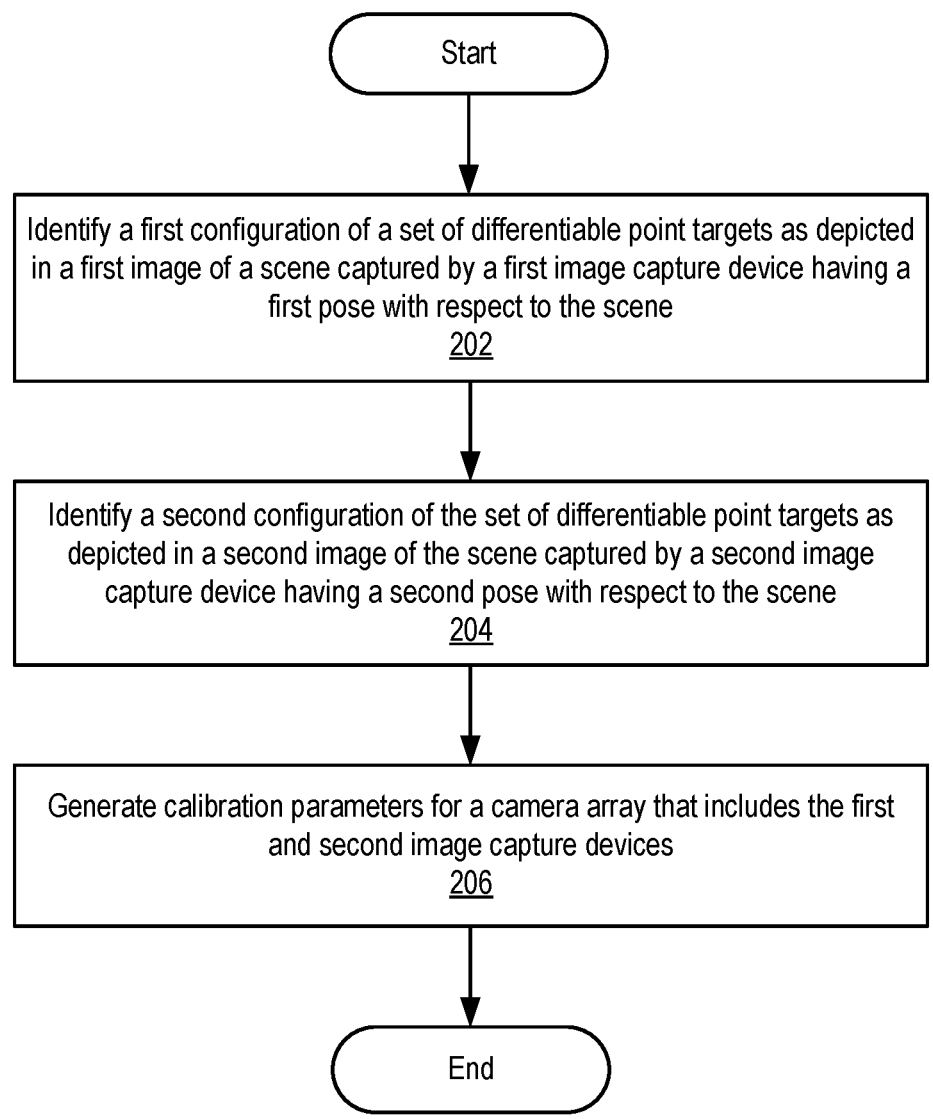
FIG. 2 shows an illustrative method for calibrating a camera array based on differentiable point targets in a capture scene.

As one example of functionality that processor 104 may perform, FIG. 2 shows an illustrative method 200 for calibrating a camera array based on differentiable point targets in a capture scene. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a camera calibration system such as system 100 and/or any implementation thereof.

In certain examples, operations of method 200 may be performed in real time so as to provide, receive, process, and/or use data described herein immediately as the data is generated, updated, changed, exchanged, or otherwise becomes available (e.g., analyzing captured images depicting differentiable point targets in different configurations and generating and refining calibration parameters as the images are being captured and received). In such examples, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by an implementation of system 100 (e.g., by processor 104 executing instructions 106 stored in memory 102).

At operation 202, system 100 may identify a first configuration of a set of differentiable point targets as depicted in a first image of a scene. The first image of the scene may be captured by a first image capture device in accordance with a first pose of the first image capture device with respect to the scene. For example, the first image capture device may be implemented by a color and/or depth camera from an array of such cameras that has been set up to capture information about the scene for any of the applications described herein (or another suitable application as may serve a particular implementation). The first pose of the first image capture device may allow the first image capture device to capture the scene from one vantage point that may be complemented by poses of other image capture devices in the camera array, which may have other poses with respect to the scene (e.g., so as to capture the scene from inward-facing perspectives all around the scene).

As described above, the set of differentiable point targets depicted in the first image analyzed at operation 202 may each be independently positionable within the scene. The differentiable point targets may be independently positionable with respect to the scene (e.g., such that each may be moved to any location in or outside of the scene) as well as with respect to one another (e.g., such that the position of one differentiable point target has no bearing on where another differentiable point targets can be positioned). Though it may be strategically advantageous or even functionally necessary for certain positioning principles to be followed (e.g., it may be preferable to distribute differentiable point targets widely rather than to bunch them together at one spot in the scene, it may be preferable to position differentiable point targets at different heights, it may be preferable to locate differentiable point targets in a manner so as to not be colinear from any vantage point of an image capture device in the camera array, etc.), differentiable point targets are still considered to be independently positionable, as that term is used herein, as long as each is able to be physically moved and positioned freely without affecting the others (e.g., they are not physically connected to one another by a physical medium like the chessboard corner features of a conventional calibration target would be). In this way, three differentiable point targets may define a virtual geometric plane that may be captured from vantage points all around the scene, rather than just from one side (as is the case with a conventional calibration target that prints certain features on a physical plane). The configuration of this virtual plane and its features (i.e., the set of differentiable point targets) is what is identified at operation 202.

Similarly, at operation 204, system 100 may identify a second configuration of the set of differentiable point targets (i.e., the same set of three or more differentiable point targets described above). In this case, however, the analysis is performed for the differentiable point targets as they are depicted in a second image of the scene, which is captured by a second image capture device in accordance with a second pose with respect to the scene. For example, the second pose may be different from the first pose (i.e., since the image capture devices are located in different places and/or are oriented in different ways from one another) such that, even though the same set of differentiable point targets is captured by both devices, the second configuration of the set of differentiable point targets is different than the first configuration identified at operation 202. Based on the difference between the first and second configurations of the set of differentiable point targets identified, respectively, at operations 202 and 204, the relationship between the first and second poses of the respective image capture devices may be mathematically determined.

As such, at operation 206, system 100 may generate calibration parameters for the camera array that includes the first and second image capture devices by analyzing the information identified at operations 202 and 204. More particularly, system 100 may generate the calibration parameters at operation 206 based on the identified first and second configurations of the set of differentiable point targets. The calibration parameters generated at operation 206 may be configured to represent the first and second poses of the first and second image capture devices. For example, the calibration parameters may be extrinsic parameters that, when combined with intrinsic parameters defining certain intrinsic characteristics of each image capture device (e.g., the focal length of the camera, how the camera may distort an image compared to an ideal pinhole camera model, etc.), may facilitate accurate and efficient correlation of information captured from the different cameras (e.g., facilitate accurate feature matching for volumetric modeling operations or other applications that are to be performed with the calibrated camera array).

Figure 3:
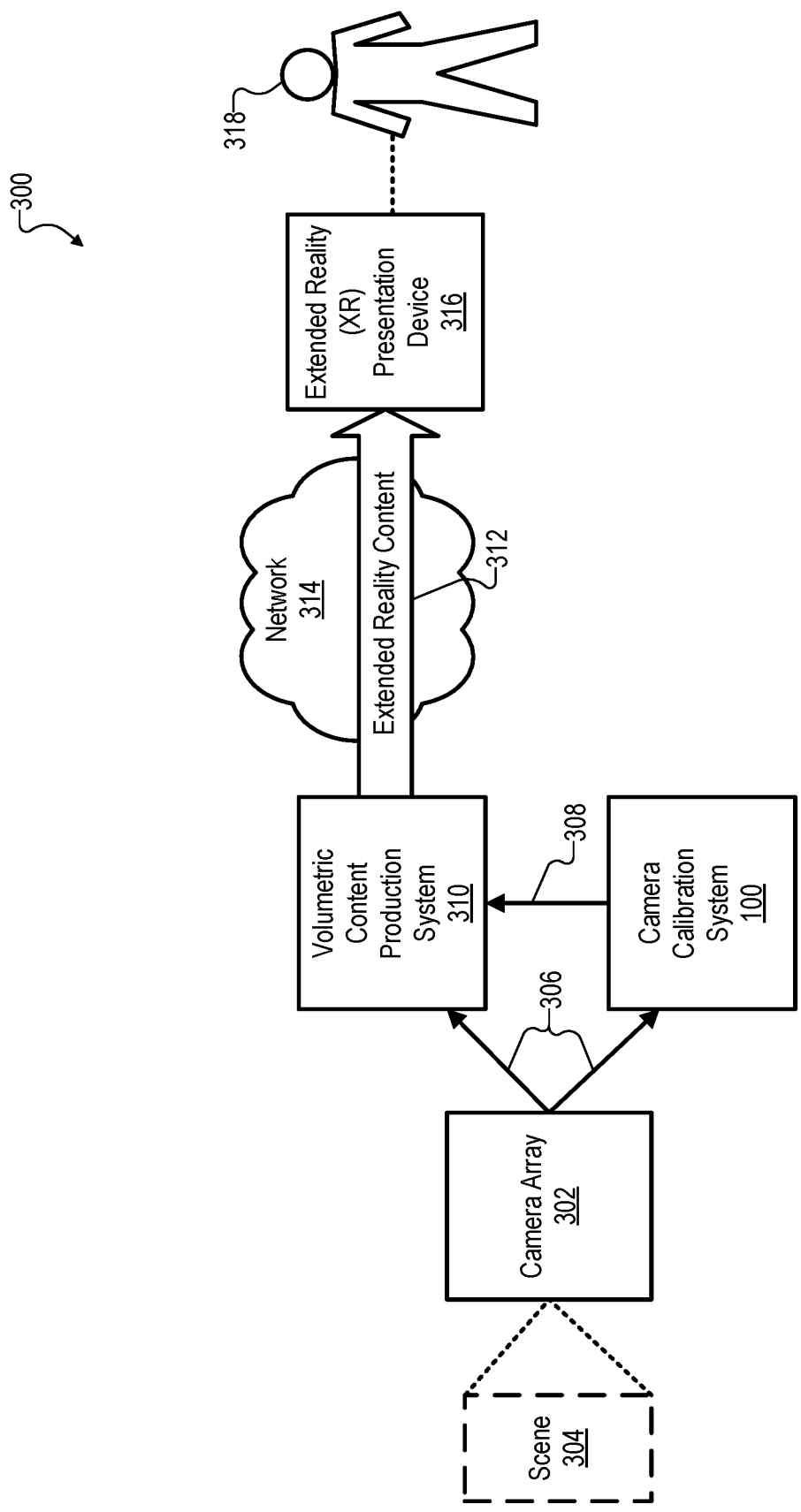
FIG. 3 shows an illustrative configuration in which a camera calibration system may operate to calibrate a camera array based on differentiable point targets in a capture scene in accordance with principles described herein.

FIG. 3 shows an illustrative configuration 300 in which a camera calibration system may operate to calibrate a camera array based on differentiable point targets in a capture scene. As shown, FIG. 3 includes an implementation of camera calibration system 100, which may operate in the same or similar ways as described above in relation to FIGS. 1 and 2. Additionally, configuration 300 explicitly shows a camera array 302, which will be understood to include a plurality of image capture devices (not individually shown in FIG. 3) configured to capture imagery from various vantage points on a scene 304. Image data 306 is shown to be produced by camera array 302 and provided to system 100 for the purpose of generating calibration parameters 308. Image data 306 may represent a plurality of images captured by the various image capture devices of camera array 302 from various poses that the image capture devices have with respect to scene 304. System 100 may generate calibration parameters 308 based on the images represented in image data 306 as described above in accordance with method 200 (and as will be further described below).

A volumetric content production system 310 is shown to receive calibration parameters 308 from system 100 and to receive additional image data 306 from camera array 302. Volumetric content production system 310 may analyze and process images represented in this image data 306 in accordance with calibration parameters 308 to generate extended reality content 312, which may be provided by way of a network 314 to an XR presentation device 316 used by a user 318 to engage in an extended reality experience based on the extended reality content.

While configuration 300 represents one particular use case or application of a camera calibration system such as system 100 (i.e., a specific extended reality use case in which image data representing objects in scene 304 is used to generate volumetric representations of the objects for use in presenting an extended reality experience to user 318), it will be understood that system 100 may similarly be used in various other use cases and/or applications as may serve a particular implementation. For example, implementations of system 100 may be used to calibrate camera arrays for use cases that do not involve extended reality content but rather are aimed at more general computer vision applications, object modeling applications, or the like. Indeed, system 100 may be employed for any suitable image processing application or use case in fields such as entertainment, education, manufacturing, medical imaging, robotic automation, or any other suitable field. Thus, while configuration 300 and various examples described and illustrated herein use volumetric object modeling and extended reality content production as an example use case, it will be understood that configuration 300 may be modified or customized in various ways to suit any of these other types of applications or use cases. Each of the elements of configuration 300 will now be described in more detail.

Camera array 302 may include a plurality of image capture devices (also referred to herein as cameras) configured to capture image data (e.g., color data, intensity data, depth data, and/or other suitable types of image data) associated with scene 304 and objects included therein (i.e., objects present at the scene). For instance, camera array 302 may include a synchronized set of video cameras that are each oriented toward the scene and configured to capture color images depicting objects at the scene. Additionally, the same video cameras (or distinct depth capture devices associated with the video cameras) may be used to capture depth images of the objects at the scene using any suitable depth detection techniques (e.g., stereoscopic techniques, time-of-flight techniques, structured light techniques, etc.). As will be illustrated in more detail below, each of the image capture devices included in a camera array such as camera array 302 may have a different pose (i.e., position and orientation) with respect to the scene being captured (i.e., scene 304 in this example). The poses of the image capture devices may be selected, for example, to provide coverage of the scene, or at least of a particular volumetric capture zone within the scene (not explicitly shown in FIG. 3), from various perspectives around the scene so that each object at the scene may be volumetrically modeled in ways described below. For instance, in one example, image capture devices of camera array 302 could be arranged in a circle around scene 304 and could be oriented to face inward toward a center of that circle, while in other examples, the image capture devices could be arranged in other suitable shapes and configurations.

Scene 304 (also referred to as a capture scene) represents any real-world area for which image data is captured by camera array 302. Scene 304 may be any suitable size from a small indoor studio space to a large outdoor field or larger space, depending on the arrangement and number of image capture devices included in camera array 302. As will be illustrated and described in more detail below, certain scenes 304 may include or otherwise be associated with a particular volumetric capture zone that is defined with an explicit boundary to guarantee a minimum level of coverage by camera array 302 (e.g., coverage from multiple perspectives around the zone) that may not necessarily be provided outside of the zone. Typically, scene 304 may include one or more objects (not explicitly shown) that are of interest in the application and that are to be volumetrically modeled (e.g., for presentation in an extended reality experience or the like). For example, scene 304 may include a set of human subjects that are to be volumetrically modeled for presentation as part of the extended reality content. In one example, for instance, scene 304 could include a playing field on which a sporting event is taking place and objects of interest within scene 304 could be a set of players engaged in the sporting event on the playing field. In other examples, scene 304 could be implemented in other ways, such as be including a stage where a concert or theatrical performance is taking place, a set for a film or television show where actors are performing, or the like. In any of these examples, a volumetric representation of one or more objects within scene 304 may be generated and provided as part of an extended reality content stream or in another suitable manner.

Image data 306 may represent images (e.g., color or intensity images, depth images, etc.) that are captured by image capture devices of camera array 302 and that depict scene 304 and objects included therein. During a setup or calibration phase, the objects depicted in these images may include differentiable point targets that have been described and will be illustrated and described in more detail below. During an operational or content production phase (e.g., after calibration is complete), the objects depicted in images of image data 306 may be objects of interest for volumetric modeling (e.g., human subjects and so forth, as described above). In some cases, as will be described, calibration and normal (e.g., content production) operations may be performed concurrently and/or continuously such that images represented in image data 306 depict both calibration-related objects (e.g., differentiable point targets) and objects that are to be volumetrically modeled. As shown, image data 306 may be provided to both system 100 and volumetric content production system 310. It will be understood that different types of images may be provided to these different systems in accordance with the roles of the systems. For example, image data 306 that is useful for calibration may be provided to system 100 and image data 306 that is useful for volumetric content production may be provided to volumetric content production system 310.

Calibration parameters 308 may be generated by system 100 based on image data 306 and in the ways described herein (e.g., in accordance with method 200, etc.). Calibration parameters 308 may indicate to volumetric content production system 310 certain physical and geometrical relationships between the poses of image capture devices within camera array 302 (e.g., with respect to one another and/or with respect to scene 304 or a global coordinate system associated with scene 304). In this way, volumetric content production system 310 may accurately and efficiently correlate image data 306 received from different cameras to generate high-quality volumetric representations of objects at scene 304. In some examples, calibration parameters 308 may include intrinsic calibration parameters defining certain intrinsic characteristics of each image capture device of camera array 302 (e.g., the focal length of the camera, how the camera may distort an image compared to an ideal pinhole camera model, etc.) as well as extrinsic calibration parameters determined by system 100 to define the respective poses of the image capture devices and thereby facilitate accurate and efficient correlation of information captured from the different cameras (e.g., facilitate accurate feature matching for volumetric modeling operations or other applications that are to be performed with the calibrated camera array).

Volumetric content production system 310 may be implemented as any suitable computing system (e.g., a MEC server, a cloud server, an on-premise server, a user equipment device, etc.) that is configured to generate extended reality content 312 based on image data 306 captured by camera array 302. As shown in FIG. 3, system 100 may provide calibration parameters 308 to volumetric content production system 310 for the purpose of effectively and efficiently producing volumetric content representative of one or more objects in scene 304. For example, the volumetric content may be produced by volumetric content production system 310 processing an image set obtained from image capture devices included in camera array 302, and the processing of the image set may be performed in accordance with calibration parameters 308 provided by system 100. In this example, the volumetric content produced by volumetric content production system 310 in this way may be integrated with extended reality content 312 that is then provided for presentation by XR presentation device 316.

Extended reality content 312 may be represented by a data stream generated by volumetric content production system 310 that includes volumetric content (e.g., volumetric representations of objects at scene 304, etc.) and/or other data (e.g., metadata, etc.) useful for presenting the extended reality content. As shown, a data stream encoding extended reality content 312 may be transmitted by way of network 314 to XR presentation device 316 so that extended reality content 312 may be presented by the device to user 318. Extended reality content 312 may include any number of volumetric representations of objects and/or other such content that allows the content, when presented by XR presentation device 316, to provide user 318 with an extended reality experience involving the volumetric object representations. For example, if scene 304 includes a playing field where a sporting event is taking place and the objects represented volumetrically in extended reality content 312 are players involved in the sporting event, the extended reality experience presented to user 318 may allow user 318 to immerse himself or herself in the sporting event such as by virtually standing on the playing field, watching the players engage in the event from a virtual perspective of the user's choice (e.g., right in the middle of the action, etc.), and so forth.

Network 314 may serve as a data delivery medium by way of which data may be exchanged between a server domain (in which system 100 and volumetric content production system 310 are included) and a client domain (in which XR presentation device 316 is included). For example, network 314 may be implemented by any suitable private or public networks (e.g., a provider-specific wired or wireless communications network such as a cellular carrier network operated by a mobile carrier entity, a local area network (LAN), a wide area network, the Internet, etc.) and may use any communication technologies, devices, media, protocols, or the like, as may serve a particular implementation.

XR presentation device 316 may represent any device used by user 318 to view volumetric representations of objects generated by volumetric content production system 310 (based on calibration parameters 308 provided by system 100) and included within extended reality content 312 received by way of network 314. For instance, in certain examples, XR presentation device 316 may include or be implemented by a head-mounted extended reality device that presents a fully-immersive virtual reality world, or that presents an augmented reality world based on the actual environment in which user 318 is located (but adding additional augmentations such as volumetric object representations produced and provided by volumetric content production system 310). In other examples, XR presentation device 316 may include or be implemented by a mobile device (e.g., a smartphone, a tablet device, etc.) or another type of media player device such as a computer, a television, or the like.

A generalized embodiment of a camera calibration system configured to calibrate a camera array based on differentiable point targets has been described in relation to FIG. 1, a generalized method for calibrating a camera array based on differentiable point targets in a capture scene has been described in relation to FIG. 2, and an example configuration in which a camera calibration system may operate to perform such a method within a context of an extended reality application has been described in relation to FIG. 3. Additional aspects and details associated with such camera calibration systems, methods, and configurations will now be described in relation to FIGS. 4-10.

Figure 4:
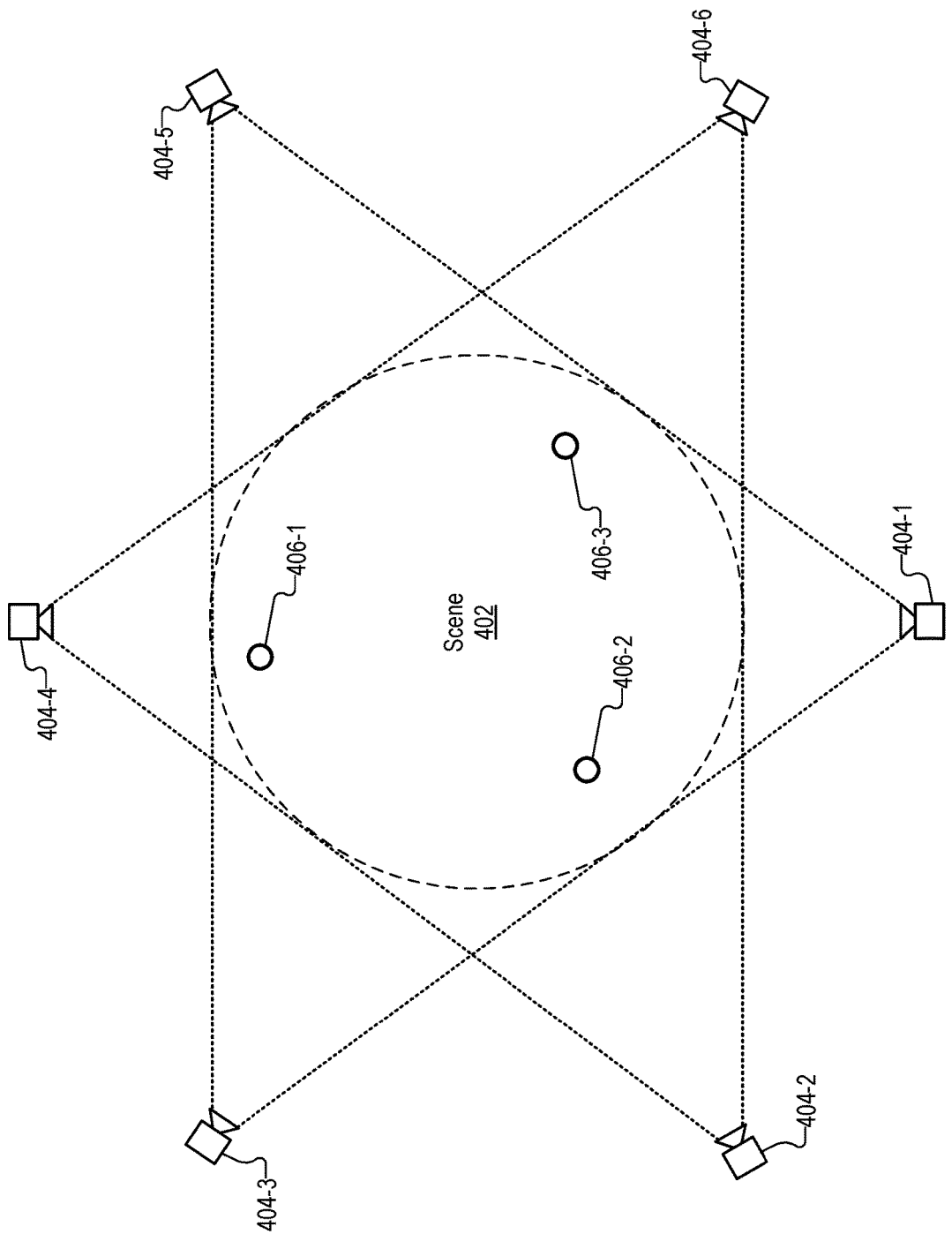
FIG. 4 shows an illustrative scene that is to be captured using an illustrative camera array that is calibrated using an illustrative set of differentiable point targets positioned within the scene.

FIG. 4 shows an illustrative scene (from a top view) that is to be captured using an illustrative camera array that is calibrated using an illustrative set of differentiable point targets positioned within the scene. Specifically, as shown, a scene 402 is demarcated by a dashed line in FIG. 4. In this example, scene 402 is shown to be circular scene surrounded by a set of six image capture devices 404 (i.e., image capture devices 404-1 through 404-6) that are distributed at equal intervals around the scene. The camera array including image capture devices 404 will be understood to be set up so as to capture image data representative of scene 402. To illustrate, each image capture device 404 is shown to be oriented toward a center of the circular scene 402 and dotted lines emanating from each image capture device 404 that represent a field of view of the image capture device is shown to be as wide as scene 402 (i.e., so as to capture imagery of the scene from the particular pose that the image capture device has). Collectively, the image capture devices 404 of the camera array are therefore arranged to capture scene 402 from various angles and perspectives, such that information about many sides of any object present within scene 402 can be effectively gathered.

Prior to or concurrent with volumetric content being generated using image data produced by image capture devices 404, the camera array incorporating image capture devices 404 may be calibrated in accordance with principles described herein. To this end, FIG. 4 shows, within scene 402, a set of differentiable point targets 406 (i.e., a set of three differentiable point targets 406-1, 406-2, and 406-3). As shown, all three differentiable point targets 406 are within the fields of view of all six of the image capture devices 404 in the camera array. That is, each image capture device 404 included in the camera array is posed at scene 402 so as to have a view of the set of differentiable point targets at a same time as other image capture devices 404 included in the camera array have a view of the set of differentiable point targets. As such, calibration parameters defining the relationships between the different image capture devices 404 may be determined based on the apparent configuration of the set of differentiable point targets as depicted in images captured by each image capture device (i.e., such that no daisy chaining is required and error associated with such daisy chaining is avoided).

While FIG. 4 shows scene 402 from a top view so that each image capture device and its respective field of view can be shown (along with the positions of the differentiable point targets within the scene), FIG. 5 shows illustrative images of scene 402 captured by two of the image capture devices 404 in accordance with their respective poses with respect to the scene. Specifically, as shown, a first image 502-1 depicts scene 402 and the set of differentiable point targets 406 as captured by image capture device 404-1 in accordance with a first pose (i.e., the pose of image capture device 404-1 as illustrated in FIG. 4), and a second image 502-2 depicts scene 402 and the set of differentiable point targets 406 as captured by image capture device 404-2 in accordance with a second pose (i.e., the pose of image capture device 404-2 as illustrated in FIG. 4).

As mentioned above, though differentiable point targets such as differentiable point targets 406 may be able to be moved and positioned independently (i.e., without influencing one another directly or physically in the manner that they would if they were, for example, all physically affixed to a single medium such as a cardboard calibration object), certain strategic considerations may be accounted for in the placement of the differentiable point targets. For example, the three differentiable point targets 406 may be strategically positioned at the scene so as to form a virtual plane simultaneously visible to each image capture device 404 included in the camera array. To this end, differentiable point targets 406 are shown to be distributed relatively far away from one another within the scene so as to form a virtual plane that will take up a significant percentage of the field of view of each image capture device 404. Moreover, other strategic placement considerations include that the differentiable point targets are positioned at different heights (i.e., a height H1 for differentiable point target 406-1, a height H2 for differentiable point target 406-2, and a height H3 for differentiable point target 406-3), which may help ensure that the virtual plane is clear from each pose of the image capture devices and the differentiable point targets are not colinear from the vantage point afforded by any of those poses.

Images 502 illustrate that objects outside of scene 402 may be depicted in images captured by the image capture devices. For example, image 502-1 (captured by image capture device 404-1) depicts at least portions of image capture devices 404-3 through 404-5 on the opposite side of scene 402 and image 502-2 (captured by image capture device 404-2) depicts at least portions of image capture devices 404-4 through 404-6. Only objects included within scene 402, however, are captured from all six vantage points of the six image capture devices in the camera array. For this reason, in this example, the entire set (all three) of differentiable point targets 406 are shown to be included within the boundary of scene 402 so as to be captured by the entire camera array.

For the virtual plane formed by the three differentiable point targets 406 to be consistently interpreted by images from all the different poses of image capture devices 404, differentiable point targets 406 may be readily differentiable from one another so that one differentiable point target is not mistaken for another. Additionally, for the differentiable point targets to serve as sharp and precise features that form the basis for a precise calibration, it may be important that each of the differentiable point targets approximate a "point" (e.g., captured by exactly one pixel, etc.) as closely as possible. Differentiable point targets 406 may implement these and other characteristics described herein in any suitable way. For example, as indicated by labels adjacent to each differentiable point target 406 (i.e., "Red" associated with differentiable point target 406-1, "Green" associated with differentiable point target 406-2, and "Blue" associated with differentiable point target 406-3), one way that the set of differentiable point targets may be clearly differentiated is to include point targets that are differentiable by being different colors from one another. Thus, as shown, the set of differentiable point targets includes a first point source of red light positioned at the scene at a first height (i.e., differentiable point target 406-1 at height H1), a second point source of green light positioned at scene 402 apart from the first point source and at a second height different from the first height (i.e., differentiable point target 406-2 at height H2), and a third point source of blue light positioned at scene 402 apart from the first and second point sources and at a third height different from the first and second heights (i.e., differentiable point target 406-3 at height H3).

The point sources of light may be implemented in any manner as may serve a particular implementation. For instance, red, green, and blue light emitting diodes (LEDs) may be held at the appropriate height by a stable structural apparatus such as a tripod that is configured to present the LED to all of the image capture devices without creating any occlusion for any of the image capture devices with respect to any of the LEDs. Though it might be ideal that the point sources of light be depicted only by a single pixel, this may be difficult or impractical to achieve in practice. For example, the halo around even a very small LED that allows it to be readily identifiable within the image may be depicted by a larger grouping of pixels. Accordingly, for instances in which the depiction of a differentiable point target uses a grouping of more than one pixel, system 100 may identify a representative pixel for the differentiable point target in any suitable way (e.g., by determining a center or average pixel of the grouping, by determining a brightest pixel in the grouping, etc.).

Figure 6:
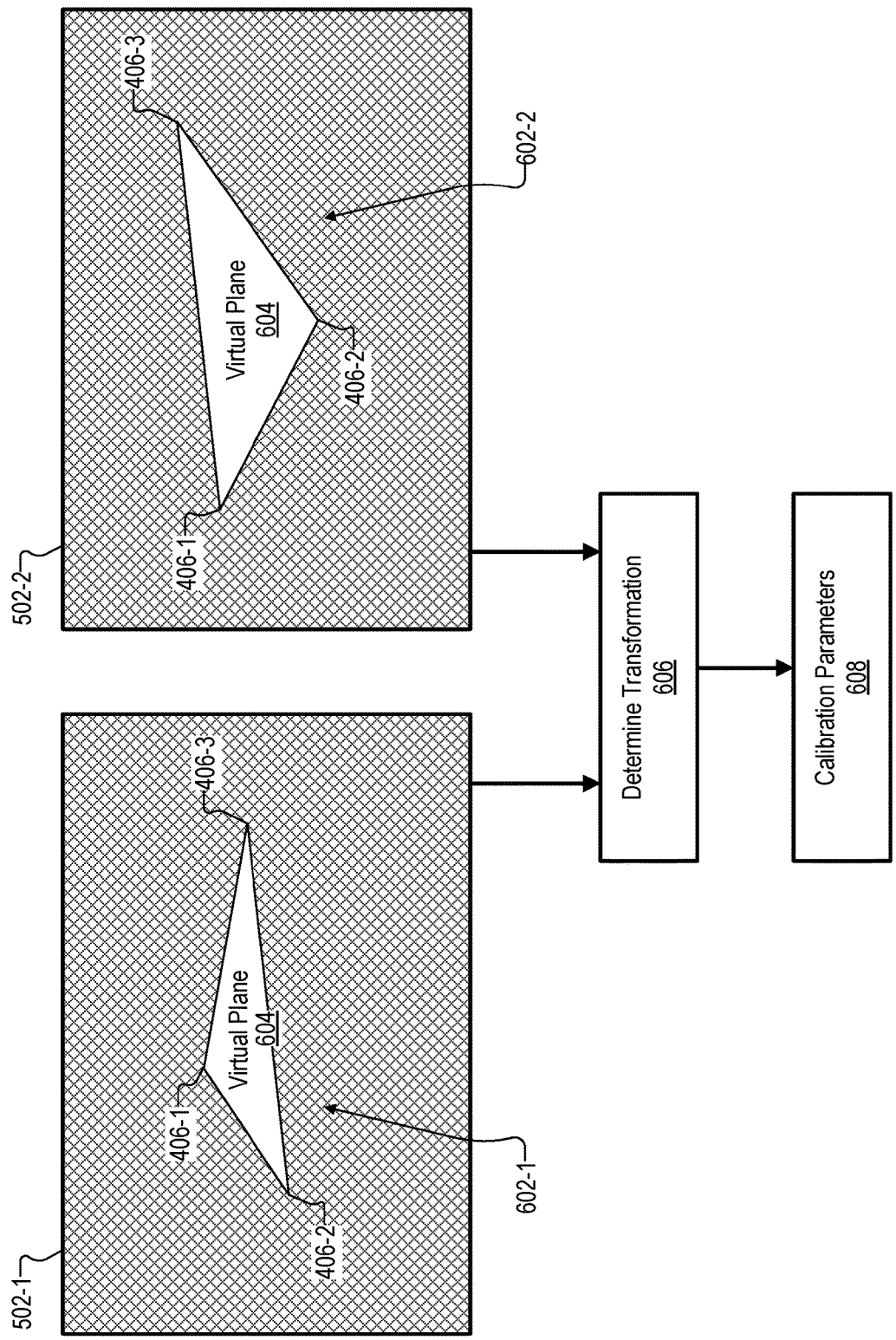
FIGS. 6-7 show illustrative aspects of how calibration parameters are generated based on different configurations of a set of differentiable point targets depicted in different images of the scene.

FIG. 6 shows illustrative aspects of how calibration parameters may be generated based on different configurations of a set of differentiable point targets depicted in different images of the scene. Specifically, as shown, a configuration 602-1 of the depiction of differentiable point targets 406-1, 406-2, and 406-3 in image 502-1 shows a virtual plane 604 formed by the differentiable point targets 406 in accordance with the first pose of image capture device 404-1, while a configuration 602-2 of the depiction of the same differentiable point targets 406 in image 502-2 shows the virtual plane 604 in accordance with the second pose of image capture device 404-2. To emphasize the configurations of differentiable point targets and the virtual plane formed thereby, images 502-1 and 502-2 are drawn in a manner that highlights the virtual plane (i.e., the triangle) formed by the three point targets in white, while shading out the remainder of the image. It will be understood that other images captured by other image capture devices 404 (images not explicitly shown in FIG. 5 or 6) may similarly depict this same virtual plane 604, but that it may take still other forms (i.e., manifested as different sizes and shapes of triangles) in accordance with the other poses of the other image capture devices.

The generating of calibration parameters such as calibration parameters 308 may be performed by determining mathematical transformations between different poses of different image capture devices based on the respective configurations of differentiable point targets as captured by the different image capture devices. For example, the generating of calibration parameters for the camera array including image capture devices 404 illustrated and described above may include determining, based on the first and second configurations 602-1 and 602-2 of the set of differentiable point targets 406 as depicted in the first and second images 502-1 and 502-2 of scene 402, a transformation between the first pose of first image capture device 404-1 and the second pose of second image capture device 404-2. To this end, FIG. 6 shows that, based on the configurations 602-1 and 602-2 of the set of differentiable point targets 406 identified in images 502-1 and 502-2, a determine transformation operation 606 may be performed by system 100 to generate calibration parameters 608.

The mathematical transformation from one configuration to another may be determined in any suitable way using features common to both images such as features associated with differentiable point targets 406 (as well as, in certain implementations described in more detail below, other features derived therefrom). The transformation determined at operation 606 may define the geometric relationship between the respective poses (i.e., positions and orientations) of image capture devices 404-1 and 404-2 (i.e., how one image capture device could to be changed in position and/or orientation to view the features in the same configuration viewed by the other image capture device) and may involve any suitable type of geometric transformation (e.g., translations, rotations, reflections, dilations, etc.).

While not explicitly shown in FIG. 6, it will be understood that similar transformations between other configurations of differentiable point targets depicted in other images captured by other image capture devices may similarly be determined so that calibration parameters for each image capture device in the camera array may be generated. In some implementations, an algorithm such as the following may be employed to determine transformations and resultant calibration parameters for each of a plurality of image capture devices in a camera array.

First, an initial image capture device may be assigned to be a baseline camera and zero values may be assigned to its position and orientation (i.e., its rotation, pitch, yaw, etc.). With this baseline established, other camera poses may be determined on a relative basis (i.e., in relation to the pose of the baseline camera rather than in relation to any global frame of reference). For example, compared to the baseline image capture device, another camera may be determined to need a rotation of +12 degrees clockwise, −4 degrees pitched downward, and so forth.

Within an image captured by the baseline camera, system 100 may identify each of the three points or features associated with the differentiable point targets disposed in the scene and in the field of view of the baseline camera. X-Y pixel coordinates of each of these colored features in this image may be recorded and the coordinates may be assigned the appropriate color (e.g., red (Xr, Yr), green (Xg, Yg), blue (Xb, Yb)). The pixel distance from each of these points to the other two points may then be calculated using these respective pixel coordinates.

Moving to a second image capture device, an image captured by this second image capture device may be analyzed to identify the configuration of the three colored points from the field of view of the second camera. Again, X-Y pixel coordinates of the three colored points may be recorded in connection with their respective colors and pixel distances between the points are computed for this image as well. At this point, pixel coordinates for points captured by the first camera may be compared to pixel coordinates for points captured by the second camera and, based on the pixel coordinate differences between each of the three pairs of colored points (e.g., the difference between (Xr, Yr) captured by the first camera and (Xr, Yr) captured by the second camera, the difference between (Xg, Yg) captured by the first camera and (Xg, Yg) captured by the second camera, etc.), the position and orientation of the second camera may be is adjusted relative to the first camera (e.g., rotation +12 deg clockwise from that of the first camera, −4 deg pitch downward from that of the first camera, etc.) until the pixel coordinates of each of the three colored points of the second camera are equal to the pixel coordinates of the three colored points captured by the first camera. All of the recorded adjustments of the second camera applied to the second view will transform the second view into the first view, such that these recorded adjustments estimate the position and orientation (i.e., the pose) of the second camera relative to the first camera. Based on the above calculation, the desired transformation between cameras is approximate (affine, projective, etc.). Values of the transformation parameters may be adjusted through iterations in which the positions of approximated feature points are projected into the images and based on the difference between desired and real position, the transformation values may be adjusted.

Having determined the transformation between the baseline (first) camera and the second camera, the algorithm may proceed to perform similar operations for each of the remainder of the cameras to likewise determine transformations with respect to the baseline camera and/or with respect to other cameras whose poses have already been characterized (i.e., other cameras that have already been calibrated and for which transformations have been determined). As these additional transformations are performed, daisy chaining is not required for any of the cameras whose vantage points allow them to view the same set of differentiable point targets as was used for the baseline camera (which includes all of the cameras in the example illustrated in FIG. 4), since a transformation may be determined with respect to the baseline directly instead of with respect to another camera that has been analyzed with respect to the baseline. Accordingly, the error potentially introduced and multiplied by conventional daisy chaining requirements may be avoided.

Even though transformations for each image capture device in this example may be determined directly with respect to the baseline camera to avoid daisy-chaining (as laid out in detail with respect to the second image capture device as described above), it may be possible, and advantageous in certain scenarios, to check for consistency with other image capture devices other than the baseline. For example, a transformation may be determined directly against the baseline and may be verified against one or more other transformations of other cameras that have already been calibrated. As another example, a transformation may be determined against a neighboring camera (or some other calibrated camera other than the baseline) and may be verified against the baseline camera that was calibrated first.

More specifically, referring to the example shown in FIG. 6 with the first and second image capture devices 404-1 and 404-2 and the first and second identified configurations 602-1 and 602-2 of the set of differentiable point targets, system 100 may be configured to calibrate a third image capture device (e.g., image capture device 404-3) as follows. System 100 may identify a third configuration of the set of differentiable point targets as depicted in a third image of the scene where the third image is captured by a third image capture device (e.g., image capture device 404-3) in accordance with a third pose of the third image capture device with respect to the scene. As illustrated by image capture device 404-3 and other image capture devices represented in FIG. 4, the third pose may be different from the first and second poses. System 100 may then, as part of generating of the calibration parameters for the camera array, generate calibration parameters that represent the third pose of the third image capture device by: 1) determining the calibration parameters that represent the third pose based on the identified second and third configurations of the set of differentiable point targets, and 2) checking the calibration parameters that represent the third pose using the identified first (baseline) configuration of the set of differentiable point targets. Alternatively, system 100 could generate the calibration parameters that represent the third pose of the third image capture device by: 1) determining the calibration parameters that represent the third pose based on the identified first (baseline) and third configurations of the set of differentiable point targets, and 2) checking the calibration parameters that represent the third pose using the identified second configuration of the set of differentiable point targets.

When checking calibration parameters (or intermediate transformation calculations) against a different calibrated image capture device, system 100 may handle mismatches in any suitable way. That is, while it may be desired that the check indicates that all of the calibration parameters are in perfect agreement and alignment with one another, there may be instances when such agreement and alignment is not indicated by the check (i.e., there may be some amount of disagreement between transformations determined with respect to different image capture devices). If the disagreement is relatively minor (e.g., within a predetermined error threshold), it may be considered to be acceptable and may be reported or ignored. Conversely, if the disagreement is more significant (e.g., outside of limits set by the predetermined error threshold), the transformation in question may be redetermined (e.g., based on a new image, etc.) and/or the calibration process may be determined to be invalid and automatically restarted or rejected (e.g., indicating to a user that calibration was not able to be successfully completed so the user can choose to try again).

While the determine transformation operation 606 of FIG. 6 shows a transformation that is determined between two images 502-1 and 502-2 based on only three corresponding point pairs (i.e., corresponding depictions of the three differentiable point targets 406-1, 406-2, and 406-3 that are shown in both images), it will be understood that mathematical algorithms used to determine certain types of transformations may require more than three corresponding point pairs. For example, certain projective transformations, for example, may require at least eight corresponding point pairs (i.e., eight common features shown in both images being compared). Accordingly, for an implementation such as illustrated in the example of FIG. 4 (which involves just three differentiable point targets 406), system 100 may bootstrap additional corresponding point pairs from the virtual plane defined by the differentiable point targets that are present (e.g., from virtual plane 604 shown in FIG. 6). This may be performed in any manner as may serve a particular implementation.

As one example, system 100 may operate in a scenario in which the set of differentiable point targets includes a first number of differentiable point targets (e.g., differentiable point targets) and the determining of the transformation (e.g., a projective transformation) may be performed based on a second number of corresponding point pairs identified in the first and second images (e.g., 8 corresponding point pairs). Since the second number (e.g., 8) is greater than the first number (e.g., 3), system 100 may use the first number of corresponding point pairs that are associated with the set of differentiable point targets themselves, as well as one or more virtual point pairs that are derived from the set of differentiable point targets (e.g., 5 virtual point pairs to make a total of 8 corresponding point pairs when combined with the 3 visible point pairs).

A practically unlimited number of virtual point pairs may be derived from two configurations of differentiable point targets (e.g., from a triangular virtual plane such as virtual plane 604), and these derivations may be performed in any manner as may serve a particular implementation. As one example, the centroid of the two triangles may be determined to create a first virtual point pair (the pair of the two centroids). As another example, the midpoints of each corresponding side of the triangle (e.g., the side between differentiable point targets 406-1 and 406-2, the side between differentiable point targets 406-2 and 406-3, etc.) may be determined to create three more virtual point pairs (one pair for each of the three sides). In still other examples, the sides may be divided into equal portions other than halves (e.g., divided in thirds to derive two intermediate points per side and two virtual pairs per side for a total of six; divided in fourths to derive three intermediate points per side and three virtual pairs per side for a total of nine; etc.), midpoints between the centroid of the triangle and each vertex (i.e., each actual differentiable point target) may be computed, and so forth.

Figure 7:
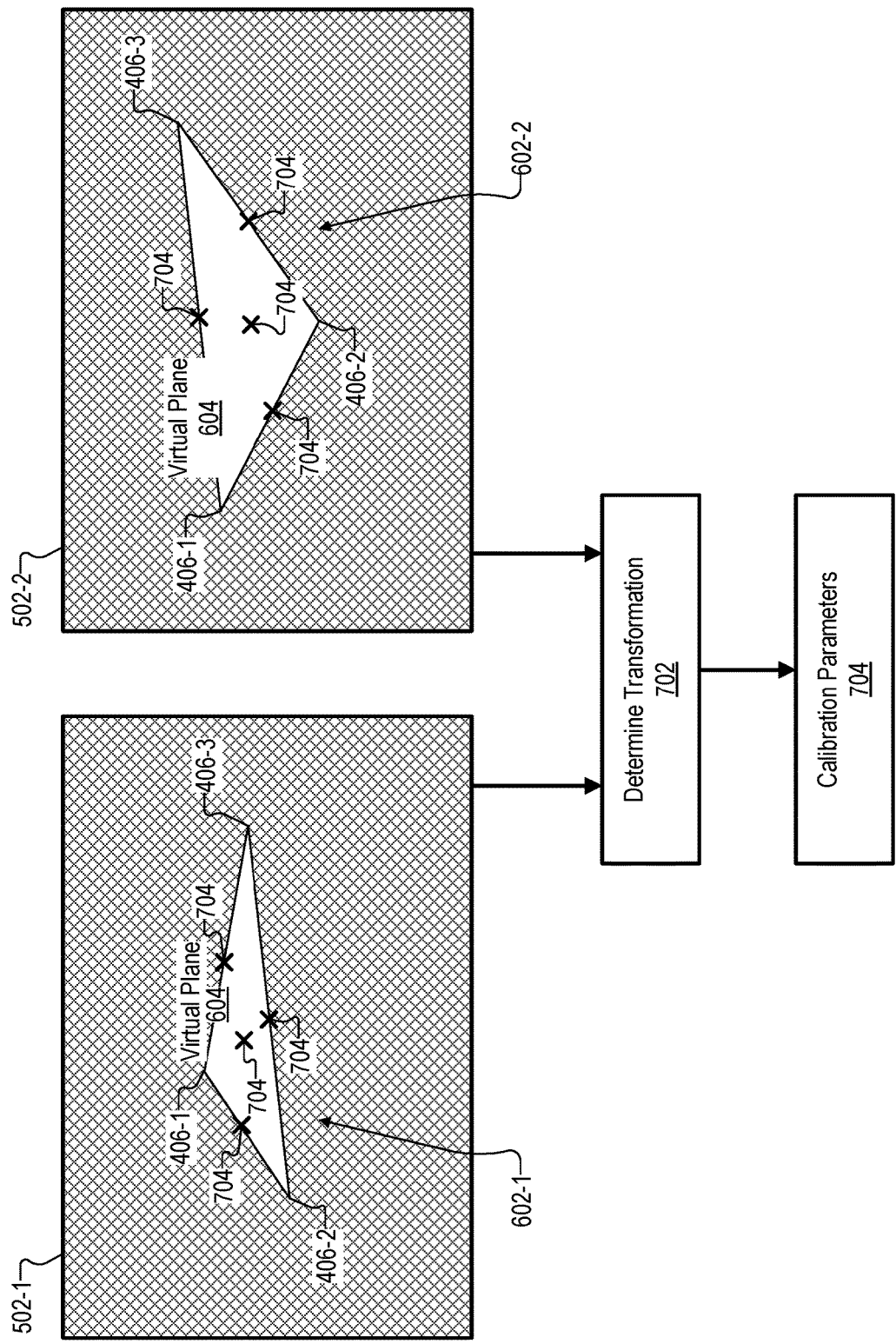

To illustrate a few examples of how virtual features may be identified to derive virtual point pairs in the ways that have been described, FIG. 7 is similar to FIG. 6 but, along with showing three vertices of the triangular virtual plane 604 in each image 502 (La, the three differentiable point targets 406), FIG. 7 also depicts small 'X's representing virtual features 704 that can be derived and used in virtual point pairs. Specifically, one virtual feature 704 shown on both virtual planes 604 is derived as the centroid of virtual plane 604 (creating a first potential virtual point pair), while three other virtual features 704 shown on both virtual planes 604 are derived at the midpoint of each side of virtual plane 604 (creating three additional potential virtual point pairs). A determine transformation operation 702 is shown in FIG. 7 to be used to generate calibration parameters 706. While the purpose of operation 702 is the same as operation 606 of FIG. 6 and the calibration parameters 706 are the same or similar to calibration parameters 608, the transformation determined at operation 702 may be a type of transformation that relies on more than the three visible corresponding point pairs (corresponding to the three differentiable point targets 406) that were shown to be available in FIG. 6. For example, operation 702 may involve determining a transformation that requires up to the 7 corresponding point pairs (i.e., 3 visible point pairs and 4 virtual point pairs) shown to be available in FIG. 7. For transformations requiring even more corresponding point pairs, additional virtual features may be computed to derive additional virtual point pairs in the ways described above.

In the example scenario that has been described in relation to FIGS. 4-7 involving scene 402, the entire set of three differentiable point targets 406 is visible to all of the image capture devices 404 simultaneously. Various advantages have been described that may arise from this type of scenario, including that no daisy-chain-related error may be introduced since all of the image capture devices are able to view the same virtual plane at the same time and none need rely on the assessment associated with another camera to connect it to a baseline camera. While these advantages are indeed beneficial, methods and systems described herein for calibrating a camera array based on differentiable point targets may still provide various benefits even in other scenarios in which all of the differentiable point targets are not able to be viewed from the poses of all the image capture devices at the same time (and where some daisy chaining may therefore be used to correlate the calibration of the entire camera array).

For example, when considering a large or irregularly-shaped (e.g., non-circular) scene, it may not be convenient or possible to position three differentiable point targets in the scene in a way that the differentiable point targets can be simultaneously viewed from all the poses of the image capture devices being used to capture the scene. Instead, a set of more than three differentiable point targets may be located at the scene in a way that each image capture device can view at least three of the differentiable point targets from the vantage point afforded by its pose at the scene, and in a way that there is significant overlap between the differentiable point targets viewed by the different image capture devices.

Figure 8:
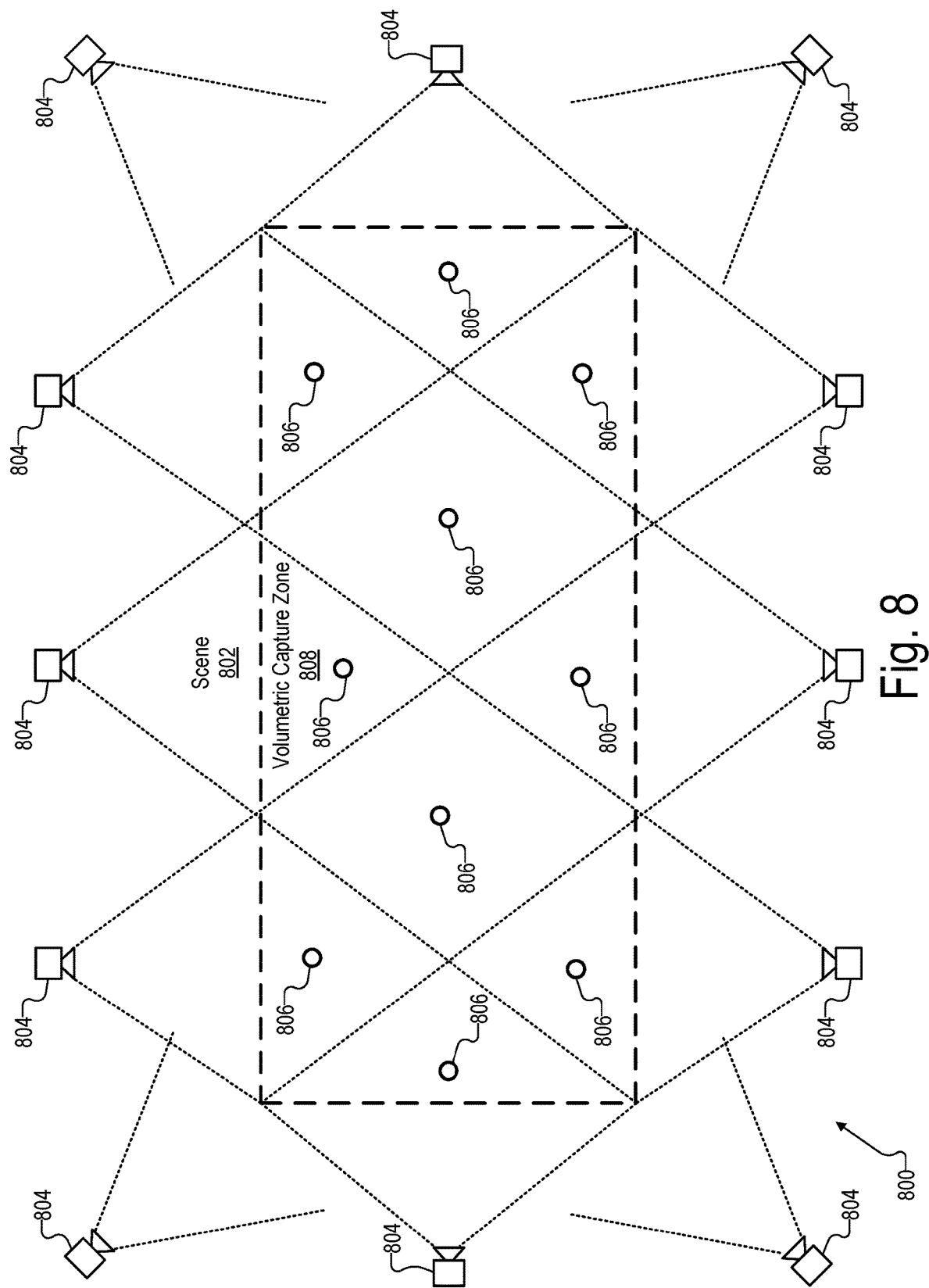
FIGS. 8-9 show illustrative scenes featuring volumetric capture zones that are to be captured using illustrative camera arrays that are calibrated using illustrative sets of differentiable point targets positioned within the scenes.

To illustrate, FIG. 8 shows an implementation 800 in which a scene 802 is relatively large and being captured by a relatively large number of image capture devices 804. As in the implementation illustrated in FIG. 4, scene 802 is shown from a top view in FIG. 8 and dotted lines emanating from each image capture device 804 indicate the field of view being captured the image capture device from the pose that the camera has with respect to scene 802. As shown, image capture devices 804 are in a rectangular formation and, at least partly as a result of that shape and the large size of scene 802, it may be seen that it would be difficult to place only three differentiable point targets in a manner that all three would be seen from the poses of all the image capture devices 804, especially with all three being somewhat widely distributed to define a virtual plane that takes a relatively large amount of each field of view. Accordingly, rather than just three differentiable point targets in this scene, FIG. 8 shows that a larger number of differentiable point targets 806 are distributed throughout scene 802 (e.g., within a volumetric capture zone 808, in this example, which will be described in more detail below) in a manner that each image capture device 804 can see at least three of the differentiable point targets (to form a virtual plane).

More particularly, the set of differentiable point targets 806 is shown to include more than three differentiable point targets positioned at the scene such that: 1) at least one differentiable point target 806 from the set is not visible to at least one image capture device 804 included in the camera array (i.e., not all of the image capture devices can see all of the differentiable point targets, as was the case in the implementation of FIG. 4); and 2) at least three differentiable point targets 806 from the set are visible to each image capture device 804 included in the camera array. As mentioned above, various benefits and advantages described herein still apply even when it is not possible for all of the image capture devices to see all of the differentiable point targets. For example, each subset of three differentiable point targets 806 still will form a virtual plane that lacks the error-introducing imperfections that a conventional calibration object such as a chessboard object would have. As another example, the wide distribution of the point targets 806 within the large scene 802 may facilitate that a significant percentage of each field of view of the image capture devices is filled by a virtual plane being used for calibration (rather than the narrow portion of the field of view that would generally be covered by any reasonably-sized conventional calibration object when viewed in a large scene).

To be able to differentiate the differentiable point targets 806 from one another, different colors may be used in accordance with principles described above. In some examples, two distinct sets of differentiable point targets (e.g., an RGB set including a red, a green, and a blue differentiable point target and a CMY set including a cyan, a magenta, and a yellow differentiable point target, etc.) may be used. In such examples, the differentiable point targets may be arranged such that every image capture device may be able, from its pose at the scene, to view at least one entire set (e.g., the RGB set or the CMY set). As long as at least some image capture devices can view differentiable point targets from both sets, calibration may be daisy-chained between the image capture devices that are calibrated on the first set and the image capture devices calibrated on the second set.

In some examples, the nature of a scene and/or the application in which the scene is being captured may be such that calibration can be performed during an initial phase (e.g., a setup phase) and that calibration will remain relevant later during an operational phase. For example, if scene 802 includes a playing field where a sporting event takes place (e.g., a basketball stadium including a basketball court where basketball games are played), calibration of image capture devices 804 (which may be placed high in the seating areas and oriented downward toward the court) may be performed during a setup phase before a game begins and may remain relevant during an operational phase that occurs while the game is ongoing and the gameplay is being captured. In implementations distinguishing setup and operational phases in this way, scene 802 (e.g., the basketball stadium in this example) may include a volumetric capture zone 808 (e.g., the basketball court where the game is played) within which each differentiable point target 806 of the set of differentiable point targets is contained. The generating of the calibration parameters may then be performed during a setup phase prior to production of volumetric content based on the volumetric capture zone (e.g., prior to the game being played on the court and volumetrically reproduced in volumetric content provided to a user). Due to the division of time between the phases in this type of implementation, FIG. 8 shows that differentiable point targets 806 may be placed directly within volumetric capture zone 808 (i.e., right on the basketball court in this example) during the setup or calibration phase, and may be removed from the volumetric capture zone 808 after calibration is complete and before the content production or operational phase begins (i.e., prior to the game being played so as not to interfere with gameplay).

In other examples, it may be advantageous to not bifurcate calibration functions and operational functions (e.g., volumetric capture) in this way, but, rather, it may be beneficial to continually check and update the calibration even during operation. If this type of implementation is desired for a volumetric capture zone such as a basketball court, the differentiable point targets may be placed at the scene where they can still be viewed by the image capture devices, but outside of the boundaries of the volumetric capture zone where they will not interfere with events occurring therein (e.g., the basketball game).

Figure 9:
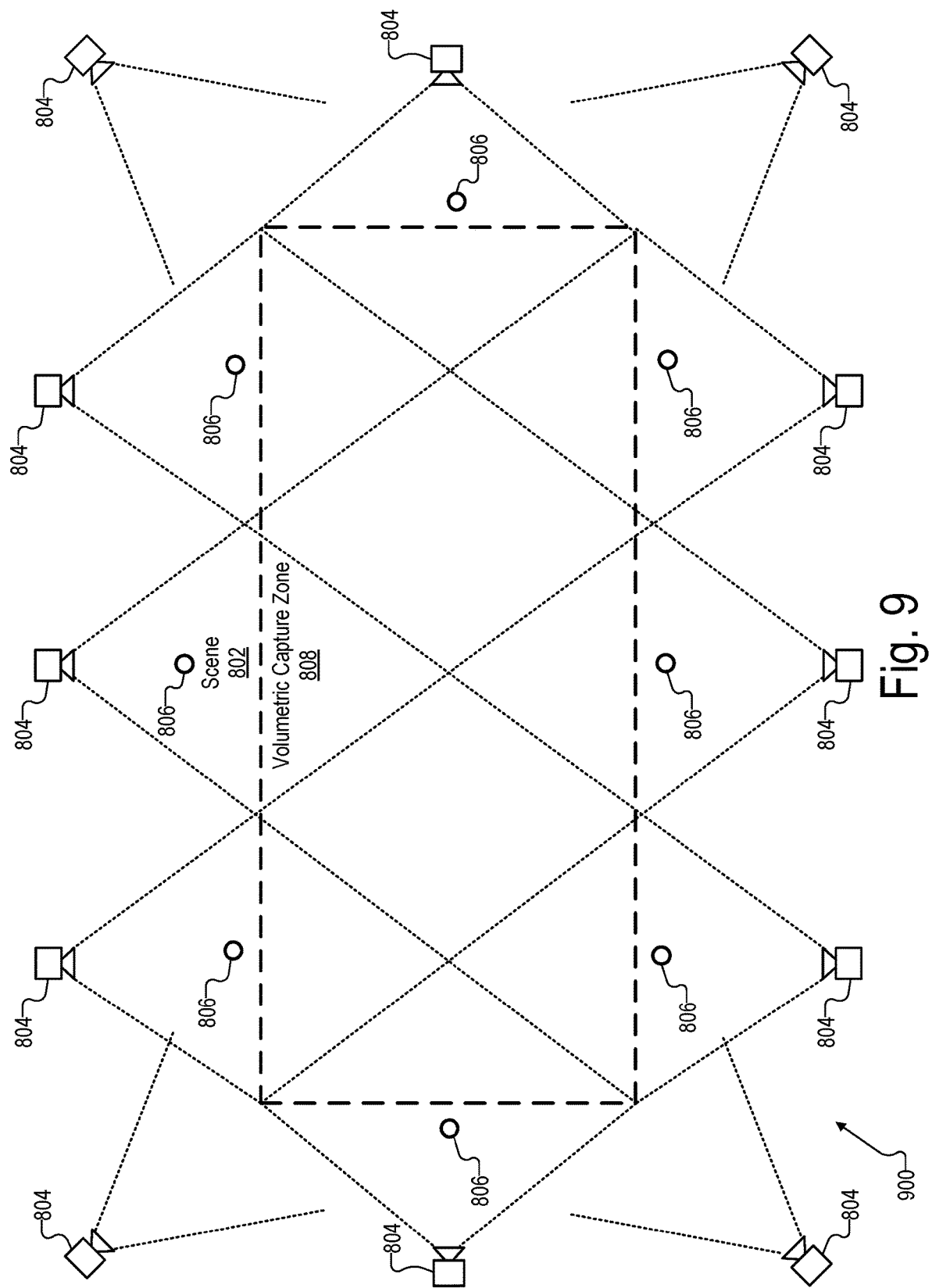

To illustrate, FIG. 9 shows an implementation 900 that is similar to implementation 800 of FIG. 8, but where the differentiable point targets 806 are all located external to volumetric capture zone 808. More particularly, as shown, scene 802 in implementation 900 is still shown to include volumetric capture zone 808, but each differentiable point target 806 of the set of differentiable point targets is positioned at scene 802 outside of volumetric capture zone 808 (rather than within it, as was the case for implementation 800). This setup may allow for the bifurcation between the setup phase and the operational phase to be done away with. Specifically, the generating of the calibration parameters may be performed during a content production phase during which volumetric content is being produced based on volumetric capture zone 808 (e.g., while a live basketball game is occurring and being volumetrically captured). For example, every few minutes during a basketball game being captured, a calibration procedure may be performed with respect to the camera array of image capture devices 804 to verify that the calibration parameters are still accurate and up to date.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
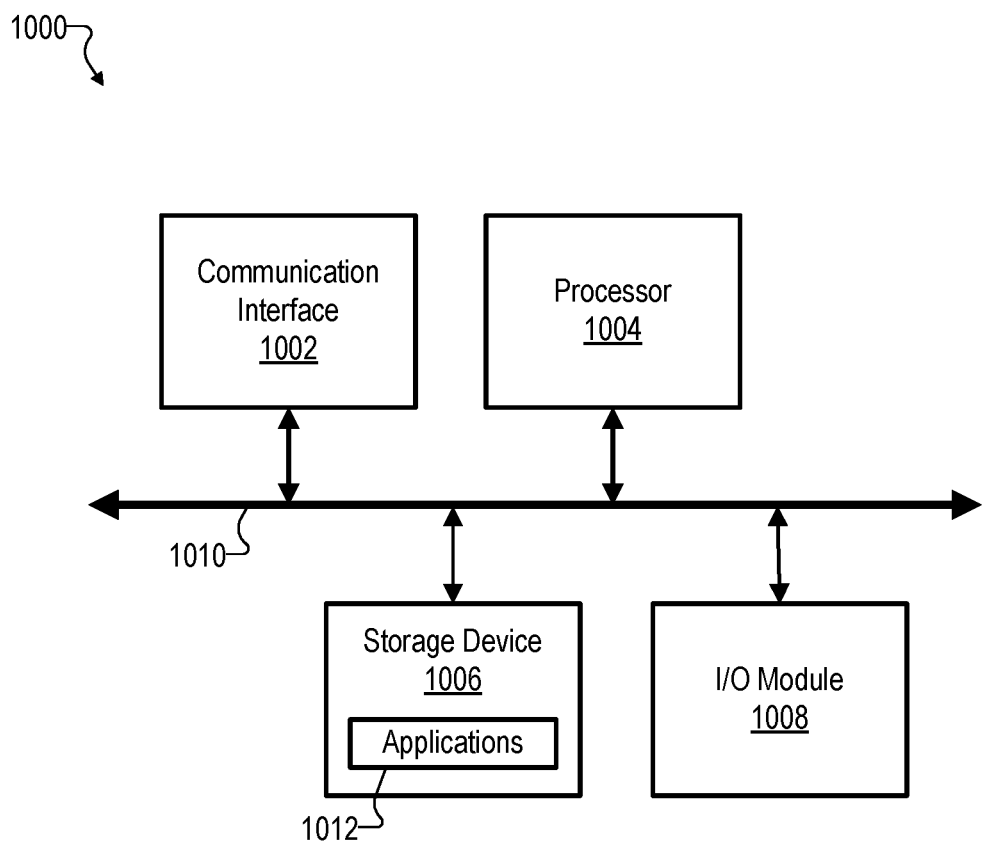
FIG. 10 shows an illustrative computing device that may implement certain of the camera calibration systems and/or other computing systems and devices described herein.

FIG. 10 shows an illustrative computing device 1000 that may implement camera calibration systems and/or other computing systems and devices described herein. For example, computing device 1000 may include or implement (or partially implement) a camera calibration system such as system 100, one or more image capture devices in a camera array such as any of the image capture devices described herein, a volumetric content production system such as volumetric content production system 310, an XR presentation device such as XR presentation device 316, certain elements of a network such as network 314, and/or any other computing devices or systems described herein (or any elements or subsystems thereof).

As shown in FIG. 10, computing device 1000 may include a communication interface 1002, a processor 1004, a storage device 1006, and an input/output (I/O) module 1008 communicatively connected via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned implementations collect, store, or employ personal information of individuals, groups or other entities, it should be understood that such information shall be used in accordance with all applicable laws concerning protection of personal information, Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   identifying, by a camera calibration system, a first configuration of a set of differentiable point targets as depicted in a first image of a scene, the set of differentiable point targets each independently positionable within the scene and the first image captured by a first image capture device in accordance with a first pose of the first image capture device with respect to the scene;
   identifying, by the camera calibration system, a second configuration of the set of differentiable point targets as depicted in a second image of the scene, the second image captured by a second image capture device in accordance with a second pose of the second image capture device with respect to the scene, the second pose different from the first pose; and generating, by the camera calibration system, calibration parameters for a camera array that includes the first and second image capture devices, the calibration parameters generated based on the identified first and second configurations of the set of differentiable point targets and configured to represent the first and second poses of the first and second image capture devices.

2. The method of claim 1, wherein:
the camera array further includes, along with the first and second image capture devices, one or more additional image capture devices; and
each image capture device included in the camera array is posed at the scene so as to have a view of the set of differentiable point targets at a same time as other image capture devices included in the camera array have a view of the set of differentiable point targets.

3. The method of claim 1, wherein the set of differentiable point targets includes point targets that are differentiable by being different colors from one another.

4. The method of claim 3, wherein the set of differentiable point targets includes:
a first point source of red light positioned at the scene at a first height;
a second point source of green light positioned at the scene apart from the first point source and at a second height different from the first height; and
a third point source of blue light positioned at the scene apart from the first and second point sources and at a third height different from the first and second heights.

5. The method of claim 1, further comprising providing, by the camera calibration system, the calibration parameters to a volumetric content production system that is configured to produce volumetric content representative of one or more objects in the scene, wherein:
the volumetric content is produced by processing an image set obtained from image capture devices included in the camera array, and
the processing of the image set is performed in accordance with the calibration parameters provided by the camera calibration system.

6. The method of claim 1, wherein the set of differentiable point targets includes three differentiable point targets positioned at the scene so as to form a virtual plane simultaneously visible to each image capture device included in the camera array.

7. The method of claim 1, wherein the set of differentiable point targets includes more than three differentiable point targets positioned at the scene such that:
at least one differentiable point target from the set is not visible to at least one image capture device included in the camera array; and
at least three differentiable point targets from the set are visible to each image capture device included in the camera array.

8. The method of claim 1, wherein the generating of the calibration parameters includes determining, based on the first and second configurations of the set of differentiable point targets as depicted in the first and second images of the scene, a transformation between the first pose of the first image capture device and the second pose of the second image capture device.

9. The method of claim 8, wherein:
the set of differentiable point targets includes a first number of differentiable point targets;
the determining of the transformation is performed based on a second number of corresponding point pairs identified in the first and second images, the second number greater than the first number; and
the second number of corresponding point pairs includes:
the first number of corresponding point pairs that are associated with the set of differentiable point targets, and
one or more virtual point pairs derived from the set of differentiable point targets.

10. The method of claim 1, further comprising:
identifying, by the camera calibration system, a third configuration of the set of differentiable point targets as depicted in a third image of the scene, the third image captured by a third image capture device in accordance with a third pose of the third image capture device with respect to the scene, the third pose different from the first and second poses;
wherein the generating of the calibration parameters for the camera array includes generating calibration parameters that represent the third pose of the third image capture device by:
determining the calibration parameters that represent the third pose based on the identified second and third configurations of the set of differentiable point targets, and
checking the calibration parameters that represent the third pose using the identified first configuration of the set of differentiable point targets.

11. The method of claim 1, wherein:
the scene includes a volumetric capture zone within which each differentiable point target of the set of differentiable point targets is contained; and
the generating of the calibration parameters is performed during a setup phase prior to production of volumetric content based on the volumetric capture zone.

12. The method of claim 1, wherein:
the scene includes a volumetric capture zone;
each differentiable point target of the set of differentiable point targets is positioned at the scene outside of the volumetric capture zone; and
the generating of the calibration parameters is performed during a content production phase in which volumetric content is being produced based on the volumetric capture zone.

13. A system comprising:
a memory storing instructions; and
one or more processors communicatively coupled to the memory and configured to execute the instructions to perform a process comprising:
identifying a first configuration of a set of differentiable point targets as depicted in a first image of a scene, the set of differentiable point targets each independently positionable within the scene and the first image captured by a first image capture device in accordance with a first pose of the first image capture device with respect to the scene;
identifying a second configuration of the set of differentiable point targets as depicted in a second image of the scene, the second image captured by a second image capture device in accordance with a second pose of the second image capture device with respect to the scene, the second pose different from the first pose; and generating calibration parameters for a camera array that includes the first and second image capture devices, the calibration parameters generated based on the identified first and second configurations of the set of differentiable point targets and configured to represent the first and second poses of the first and second image capture devices.

14. The system of claim 13, wherein:
the camera array further includes, along with the first and second image capture devices, one or more additional image capture devices; and
each image capture device included in the camera array is posed at the scene so as to have a view of the set of differentiable point targets at a same time as other image capture devices included in the camera array have a view of the set of differentiable point targets.

15. The system of claim 13, wherein the set of differentiable point targets includes:
a first point source of red light positioned at the scene at a first height;
a second point source of green light positioned at the scene apart from the first point source and at a second height different from the first height; and
a third point source of blue light positioned at the scene apart from the first and second point sources and at a third height different from the first and second heights.

16. The system of claim 13, wherein:
the process further comprises providing the calibration parameters to a volumetric content production system that is configured to produce volumetric content representative of one or more objects in the scene;
the volumetric content is produced by processing an image set obtained from image capture devices included in the camera array; and
the processing of the image set is performed in accordance with the calibration parameters provided by the camera calibration system.

17. The system of claim 13, wherein the set of differentiable point targets includes three differentiable point targets positioned at the scene so as to form a virtual plane simultaneously visible to each image capture device included in the camera array.

18. The system of claim 13, wherein the generating of the calibration parameters includes determining, based on the first and second configurations of the set of differentiable point targets as depicted in the first and second images of the scene, a transformation between the first pose of the first image capture device and the second pose of the second image capture device.

19. The system of claim 13, wherein:
the process further comprises identifying a third configuration of the set of differentiable point targets as depicted in a third image of the scene, the third image captured by a third image capture device in accordance with a third pose of the third image capture device with respect to the scene, the third pose different from the first and second poses; and
the generating of the calibration parameters for the camera array includes generating calibration parameters that represent the third pose of the third image capture device by:
determining the calibration parameters that represent the third pose based on the identified second and third configurations of the set of differentiable point targets, and
checking the calibration parameters that represent the third pose using the identified first configuration of the set of differentiable point targets.

20. A non-transitory computer-readable medium storing instructions that, when executed, direct a processor of a computing device to perform a process comprising:
identifying a first configuration of a set of differentiable point targets as depicted in a first image of a scene, the set of differentiable point targets each independently positionable within the scene and the first image captured by a first image capture device in accordance with a first pose of the first image capture device with respect to the scene;
identifying a second configuration of the set of differentiable point targets as depicted in a second image of the scene, the second image captured by a second image capture device in accordance with a second pose of the second image capture device with respect to the scene, the second pose different from the first pose; and
generating calibration parameters for a camera array that includes the first and second image capture devices, the calibration parameters generated based on the identified first and second configurations of the set of differentiable point targets and configured to represent the first and second poses of the first and second image capture devices.

* * * * *